United States Patent
Bortolini

(10) Patent No.: US 6,687,907 B1
(45) Date of Patent: Feb. 3, 2004

(54) PREVENTION OF BROADBAND CABLE SERVICE THEFT

(75) Inventor: Edward J Bortolini, Nederland, CO (US)

(73) Assignee: Lucent Technologies Inc., Murray Hill, NJ (US)

( * ) Notice: Subject to any disclaimer, the term of this patent is extended or adjusted under 35 U.S.C. 154(b) by 698 days.

(21) Appl. No.: 09/642,122

(22) Filed: Aug. 18, 2000

(51) Int. Cl.[7] .......................... H04N 7/173; H04N 7/16; H04N 7/18; H04N 17/00; H04N 17/02

(52) U.S. Cl. ...................... 725/107; 725/108; 725/25; 725/26; 725/27; 725/80; 725/82; 725/105; 725/106; 725/121; 725/122; 725/127; 725/129; 348/180; 348/192; 348/193

(58) Field of Search ................... 725/25–31, 80, 725/82, 105–108, 119, 120, 122, 127–129, 147; 348/180, 192, 193; 340/853.2, 531; 455/410; 370/242; 379/399.01, 413, 322, 22, 29.01

(56) References Cited

U.S. PATENT DOCUMENTS

| | | | | |
|---|---|---|---|---|
| 4,435,850 A | * | 3/1984 | Bowen et al. | 340/555 |
| 4,878,245 A | * | 10/1989 | Bradley et al. | 725/25 |
| 5,331,412 A | * | 7/1994 | Farmer et al. | 725/25 |
| 5,604,528 A | * | 2/1997 | Edwards et al. | 725/25 |
| 5,614,939 A | * | 3/1997 | DeBalko | 725/148 |

* cited by examiner

Primary Examiner—John Miller
Assistant Examiner—Michael W. Hoye

(57) ABSTRACT

Detecting tampering of an incoming cable to which a network interface unit (NIU) is connected by testing for the reflected signal that is present when the signal being transmitted to the head end is not connected to a properly terminated coaxial cable. In particular, by comparing the phase of the transmitted signal from the NIU with that of the reflected signal, a distinction can be made between a signal that travels many feet before being reflected back and a signal that reflects back right or near the connector of the NIU. Only the latter is used as a stimulus to indicate tampering since the first is likely caused by cable personnel disconnecting the cable further into the network. The key difference between the two types of reflected signals is the time delay of the reflect signal with respect to the transmitted signal from the NIU. The method can be used to detect a bridge tap, because the tap causes the characteristic impedance of the cable to decrease causing an infeed mismatch and subsequent reflected energy. When tampering or a bridge condition is detected, the NIU disrupts service by disabling the video signal to the residence, disable Internet access, and disable telephony service with the exception of 911 calls and calls to the service provider. To restore service, the cable service provider intervenes and sends a specific data sequence to the NIU in order to restore service. The cable service provider then can investigate and determine the reason for the disruption.

20 Claims, 4 Drawing Sheets

PREVENTION OF BROADBAND CABLE SERVICE THEFT

TECHNICAL FIELD

This invention relates to broadband cable service and more particularly, to an arrangement for detecting tampering with the broadband cable.

BACKGROUND OF THE INVENTION

Modern broadband cable networks can provide broadcast video, video on demand, pay per view, primary line telephony, and high speed wide band data access all over the same physical medium that can be shared between 50 to 500 households. With the advent of primary line telephone service over these networks, network access is provided or prohibited using a network interface unit (NIU) normally located at the entrance to the customer's premise. This entrance is normally on the back of the residence. The NIU is a network element that is owned and controlled by the service provider and not the consumer. The NIU establishes a clear point of demarcation between the customer premise and the cable network. It is to the service provider's advantage to use a common NIU to control access to video, telephone, and high speed Internet data service. Hence, access to any particular service is either permitted or restricted using the electronics within the NIU. Therefore, theft of service or privacy violations require that this unit be bypassed and/or replaced by a modified unit. The NIU also assures that the privacy of an individual residence is protected from other residences. Within the prior art, it is known for service providers to perform periodic inspections to determine if an NIU has been bypassed or bridged so as to illegally receive broadcast video service or monitors another user's Internet data. This practice is costly to perform and not particularly effective.

The problem remains to provide an effective and economic method for detecting if an NIU has been bypassed or bridged.

SUMMARY OF THE INVENTION

The foregoing problem is solved and a technical advance is achieved by detecting tampering of an incoming cable to which an NIU is connected by testing for a reflected signal that is present when the signal being transmitted to the head end is not connected to a properly terminated coaxial cable. In particular, by comparing the phase of the transmitted signal from the NIU with that of the reflected signal, a distinction can be made between a signal that travels many feet before being reflected back and a signal that reflects back right or near the connector of the NIU. Only the latter is used as a stimulus to indicate tampering since the first is likely caused by cable personnel disconnecting the cable further into the network. The key difference between the two types of reflected signals is the time delay of the reflect signal with respect to the transmitted signal from the NIU. Advantageously, the method can be used to detect a bridge tap, because the tap causes the characteristic impedance of the cable to decrease causing an infeed mismatch and subsequent reflected energy.

Advantageously, when tampering or a bridge condition is detected, the NIU disrupts service by disabling the video signal to the residence, disable Internet access, and disable telephony service with the exception of 911 calls and calls to the service provider. To restore service, the cable service provider intervenes and sends a specific data sequence to the NIU in order to restore service. The cable service provider then can investigate and determine the reason for the disruption.

These and other features and advantages of the invention will become apparent from the following description of the illustrative embodiments of the invention considered together with the drawing.

DETAILED DESCRIPTION

Figure 1:
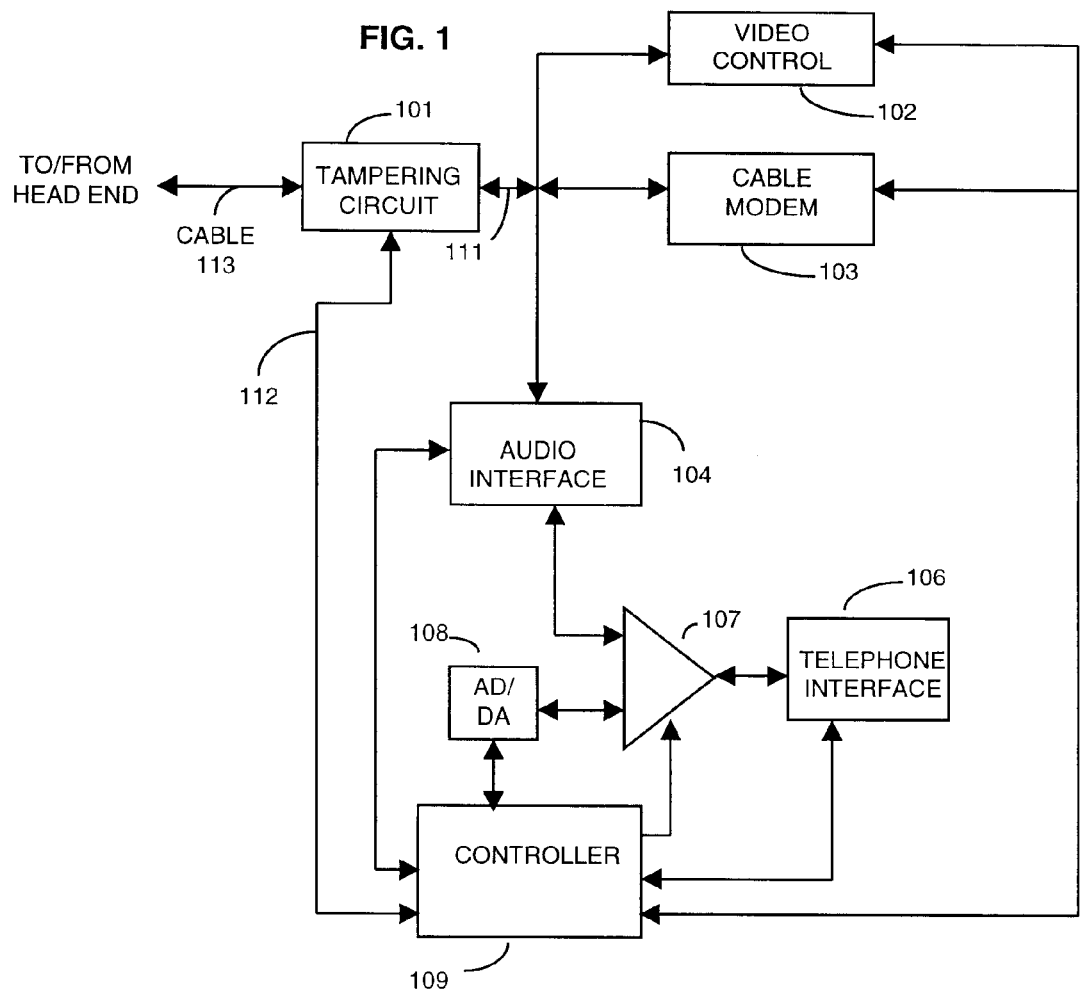
FIG. 1 is a block diagram of a network interface unit for implementing the invention.

FIG. 1 illustrates a network interface unit (NIU) for implementing the invention. Controller 109 provides overall control of the elements illustrated in FIG. 1. Telephone interface 106 provides communication with a telephone handset. Telephone interface 106 provides the battery feed and the ringing information for the telephone handset. Multiplexer/demultiplexer 107 is utilized to communicate information either with audio interface 104 or converter 108. Converter 108 is an AD/DA converter and is utilized by controller 109 to receive signaling information from the telephone set via elements 106 and 107 and to transmit information to the telephone set. Audio interface 104 provides the audio interface to cable 113 connected to the head end via tampering circuit 101. In addition, audio interface 104 is the interface for signaling information transmitted and received by controller 109 with the head end unit. Controller 109 utilizes this control information to control the telephone handset and video control 102 and cable modem 103. Video control 102 provides the interface for a video receiver. Cable modem 103 provides wide band data service via cable 113. Tampering circuit 101 in conjunction with controller 109 implements the invention. Link 112 between tampering circuit 101 and controller 109 provides for the communication of data as well as control signals.

Figure 2:
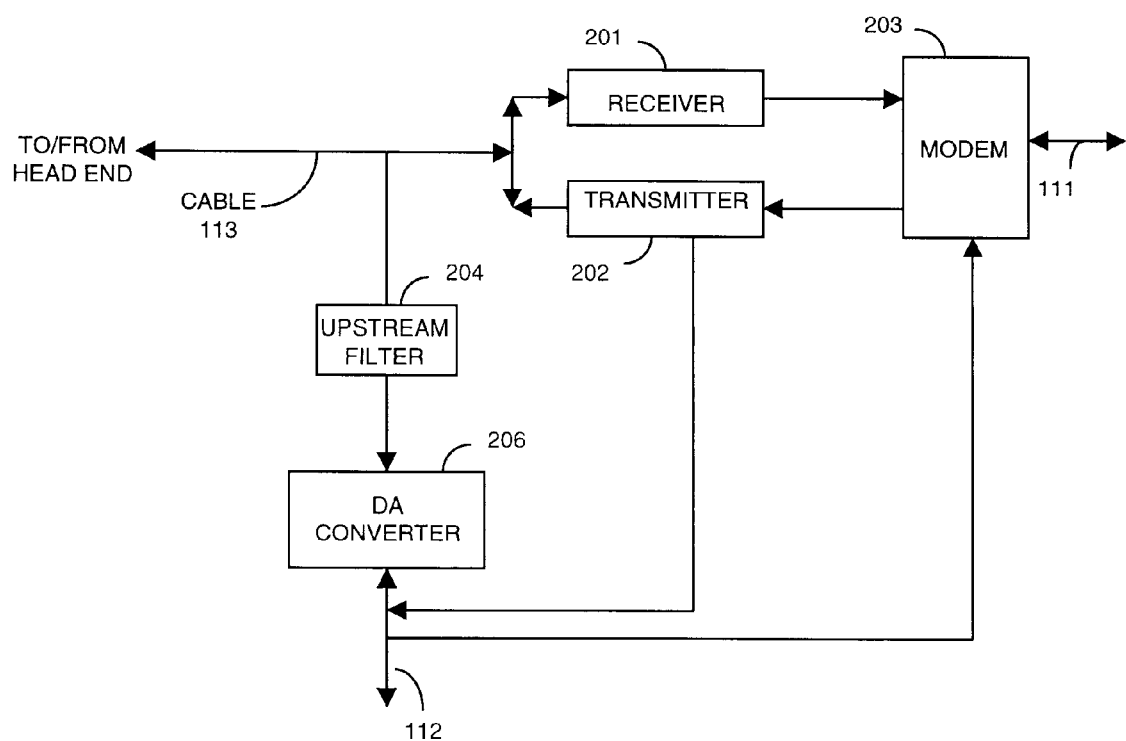
FIG. 2 is a block diagram of a tampering detector for implementing the invention.

FIG. 2 illustrates in greater detail tampering circuit 101. Cable 113 is a bi-directional link with the head end of the cable system. Receiver 201 is utilized to receive information from cable 113 and to transmit this information to modem 203 which transmits on bi-directional link 111 of FIG. 1. Transmitter 202 is responsive to the output of modem 203 to transmit the received information from modem 203 on cable 113. Receiver 201 receives information from cable 113 in a frequency range that is different from the frequency range utilized by transmitter 202 to transmit on cable 113. The output of transmitter 202 is commonly referred to as the upstream transmission or link. The operations of elements 201–203 are well known by those skilled in the art. Upstream filter 204 is only responsive to the output of transmitter 202 and communicates this output to digital-to-analog (DA) converter 206. Converter 206 converts the output of transmitter 202 into digital information that is utilized by controller 109 in the following manner.

Figure 4:
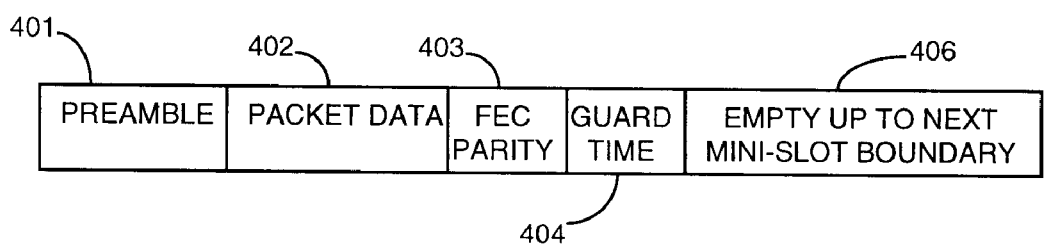
FIG. 4 illustrates an upstream packet for use with the invention.

FIG. 4 illustrates the packet that is transmitted by cable modem 103 via tampering circuit 101 as illustrated in FIG.

1. The packet is in accordance with the Data-Over-Cable Service Interface Specification (DOCSIS) as set forth by Cable Television Laboratories, Incorporated and is referred to for the purposes of the packet illustrated in FIG. 4 as DOCSIS 1.0. As illustrated in FIG. 4, the packet s comprises preamble 401. In addition, the packet has packet data 402 and FEC parity 403 which are referred to in the specification as a code word. The packet then has guard time 404 which is followed by an amount of time 406 that is labeled "empty up to next mini-slot boundary." As set forth in the specification, there can be two code words each consisting of elements 402 and 403. For convenience, FIG. 4 illustrates a packet with only one code word.

Transmitter 202 of FIG. 2 signals controller 109 when the preamble 401 is being transmitted on cable 113. Upstream filter 204 transfers this information to DA converter 206. After converting the information into digital information, converter 206 transmits a first portion of packet to controller 109 via link 112. This portion of the packet may be advantageously only preamble 401. Controller 109 saves this information in memory, waits a fixed amount of time, and then, once again accepts digital information from converter 206. This new digital information is timed so as to allow for a fixed distance from transmitter 202 for a reflection to occur. Controller 109 then searches the reflected data to find preamble 401 of the transmitted packet. Once the preamble is determined in the reflected information, controller 109 compares this with the originally transmitted packet to determine if the reflections indicate that tampering is occurring with respect to cable 113. The distance at which controller 109 makes these measurements is done in increments over a minimum distance to a maximum distance. Where the maximum distance is a distance less than the pole side of the cable going to the head end. At the pole, there are upstream and downstream unidirectional filters that prevent upstream transmission from other NIU's from reaching the NIU illustrated in FIG. 1. These unidirectional filters allow controller 109 to search for reflected information that is only reflected from transmitter 202 within some threshold level.

Figure 3:
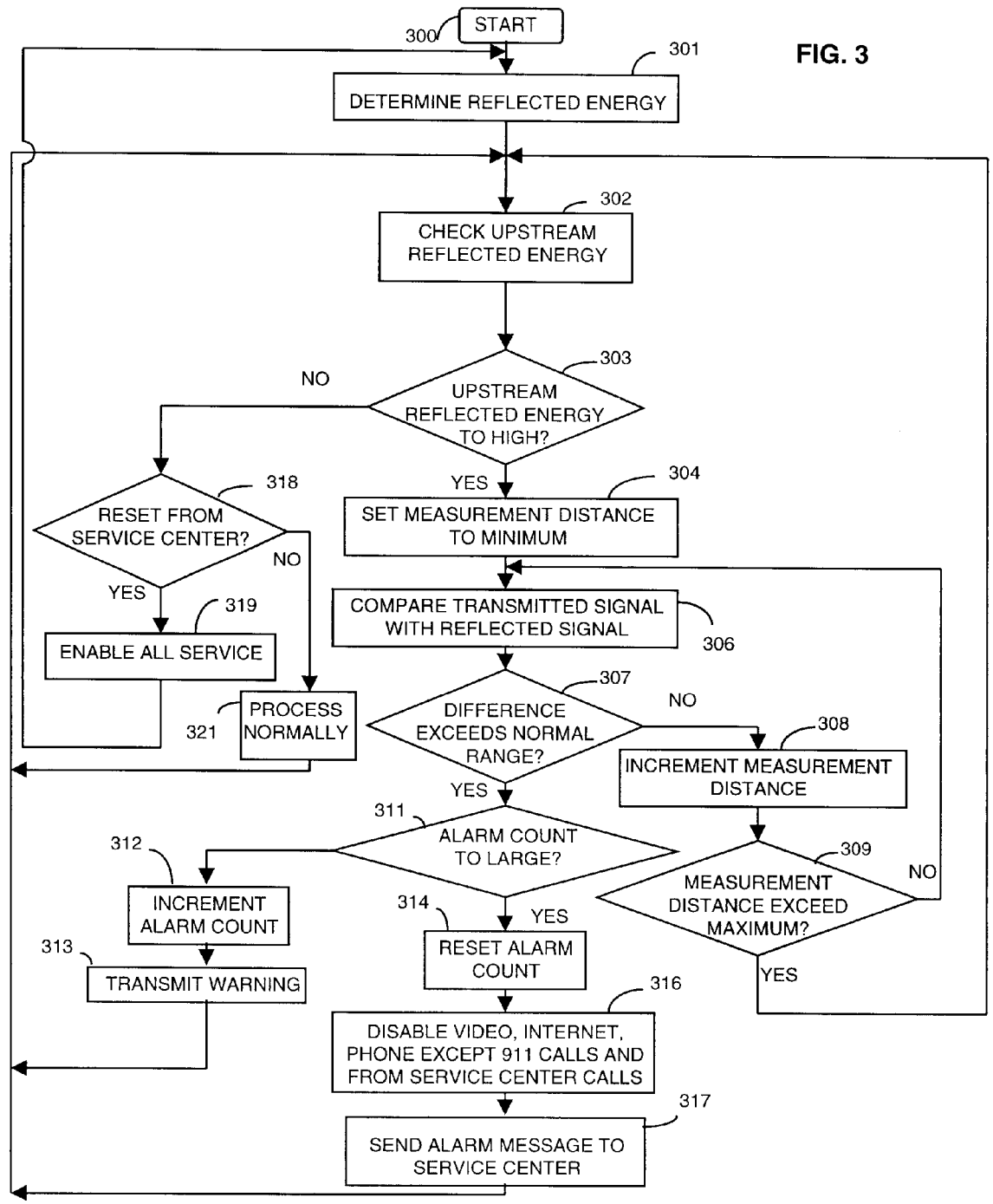
FIG. 3 illustrates, in flowchart form, steps performed by the controller within an NIU for implementing the invention.

FIG. 3 illustrates, in flowchart form, the steps performed by controller 109 in implementing the invention. After being started in block 300, block 301 determines the normal upstream reflected energy before transferring control to block 302 that is part of the main processing loop. Block 302 measures the total reflected energy. Decision block 303 then determines if this upstream reflected energy is too high as compared to the reflected energy determined by block 301. If the answer is yes, block 304 sets the measurement distance to minimum so that the point at which reflections are occurring can be determined. Block 306 compares the transmitted signal with the reflected signal at the set distance. Decision block 307 determines if the difference between the transmitted signal and the reflected signal exceeds a normal range. If the answer is no, block 308 increments the measurement distance by a predetermined amount before transferring control to decision block 309. The latter decision block determines if the new measurement distance exceeds the maximum distance from the NIU over which measurements are to be performed. If the answer is no, control is transferred back to block 306. If the answer is yes, control is transferred back to block 302.

Returning to decision block 307, if the answer is yes that the difference between the transmitted signal and the reflected signal exceeds the normal range, control is transferred to block 311 to determine if the customer has received the warning of tampering with the cable for the predetermined number of times. The number of times that the warning has been transmitted is maintained in alarm count. Block 311 tests the alarm count to determine if it exceeds the maximum value. If the answer is yes, control is transferred to block 314. The latter block resets the alarm count and transfers control to block 316. Block 316 disables the video, wide band data, and telephony service by the NIU. The exception is that telephony service is still allowed for emergency calls, e.g., 911 and calls to and from a service center. Block 317 then sends an alarm message to the service center before transferring control back to block 302.

Returning to block 311, if the alarm count does not exceed the predetermined maximum, control is transferred to block 312 which increments the alarm count. Next, controller 109 places a call via elements 106–108 to the customer's telephone handset and informs the customer that tampering has been detected on the cable and that the customer should call the service center. After execution of block 313, controls is transferred back to block 302.

Returning to block 303, if the upstream reflected energy is not beyond the acceptable amount, control is transferred to decision block 318. The latter decision block determines whether a reset has been received from the service center. If the answer is yes, block 319 enables all service for video, wide band data, and telephony before transferring control back to block 301. If the answer in decision block 313 is no, block 321 performs normal processing before returning control back to block 302.

Of course, various changes and modifications to the illustrative embodiment described above will be apparent to those skilled in the art. Such changes and modifications can be made without departing from the spirit and scope of the invention and without diminishing its intended advantages. It is therefore intended that such changes and modifications be covered by the following claims except insofar as limited by the prior art.

What is claimed is:

1. A method for determining from a local unit an occurrence of tampering with an electrical link, comprising the steps of:
    (a) detecting transmission of a packet on the electrical link by the local unit;
    (b) storing a portion of the transmitted packet;
    (c) waiting for a period of time;
    (d) storing reflected signals from the electrical link;
    (e) selecting a portion of the reflected signals that are in alignment with the portion of the transmitted packet;
    (f) calculating the reflected energy of the selected portion of the reflected signals;
    (g) transmitting an alarm message to a service center upon the reflected energy exceeding a predetermined amount;
    (h) increasing the period of time by a fixed amount upon the reflected energy being smaller than the predetermined amount; and
    (i) performing steps (a) through (h) upon the reflected energy being smaller than the predetermined amount and the period of time being less than a predetermined amount of time.

2. The method of claim 1 wherein the step of transmitting the alarm message to the service center comprises the step of disabling service provided by the local unit.

3. The method of claim 2 wherein the step of disabling comprises the step of allowing emergency telephone calls to be placed through the local unit.

4. The method of claim 3 wherein the step of disabling further comprises the step of allowing telephone calls to and from the service center.

5. The method of claim 2 wherein the step of disabling comprises the step of allowing the reflected energy to be greater than the predetermined amount for a fixed number of cycles before disabling service provided by the local unit.

6. The method of claim 5 wherein the step of transmitting the alarm message comprises the step of transmitting another alarm to a customer served by the local unit.

7. The method of claim 6 wherein the step of transmitting the other alarm comprises the step of establishing a telephone call to a telephone directly connected to the local unit; and transmitting a voice message to the telephone.

8. The method of claim 1 wherein the stored portion of the transmitted packet is a preamble of the packet.

9. The method of claim 1 wherein the period of time represents a distance from the local unit along the electrical link that can be traveled by the transmitted packet in the period of time.

10. The method of claim 1 further comprises the step of restoring service provided by the local unit in response to a message from the service center to the local unit.

11. An apparatus for performing the method of claim 1.
12. An apparatus for performing the method of claim 2.
13. An apparatus for performing the method of claim 3.
14. An apparatus for performing the method of claim 4.
15. An apparatus for performing the method of claim 5.
16. An apparatus for performing the method of claim 6.
17. An apparatus for performing the method of claim 7.
18. An apparatus for performing the method of claim 8.
19. An apparatus for performing the method of claim 9.
20. An apparatus for performing the method of claim 10.

* * * * *